(12) United States Patent
Shibata et al.

(10) Patent No.: US 7,597,385 B2
(45) Date of Patent: Oct. 6, 2009

(54) CAB DOOR STRUCTURE

(75) Inventors: Takashi Shibata, Sakai (JP); Yoshifumi Horiuchi, Sakai (JP); Yoshihiro Kawahara, Sakai (JP); Mitsugu Kobayashi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/853,496

(22) Filed: Sep. 11, 2007

(65) Prior Publication Data

US 2008/0093882 A1 Apr. 24, 2008

(30) Foreign Application Priority Data

Oct. 20, 2006 (JP) .............................. 2006-286567

(51) Int. Cl.
*B60J 5/04* (2006.01)
(52) U.S. Cl. ................................. 296/190.11
(58) Field of Classification Search ............ 296/190.01, 296/190.08, 190.11, 191, 146.1, 146.5
See application file for complete search history.

(56) References Cited

U.S. PATENT DOCUMENTS 3,288,488 A * 11/1966 Shinn ........................ 280/165
5,125,716 A * 6/1992 Smith et al. ............. 296/190.11
5,557,888 A * 9/1996 Ruchat et al. .................. 49/362
6,485,084 B2 * 11/2002 Sorensen et al. ............. 296/102
7,281,753 B2 * 10/2007 Curtis et al. ............. 296/146.1
7,422,267 B2 * 9/2008 Curtis et al. ........... 296/146.12
2007/0210617 A1* 9/2007 Nakamura ............. 296/190.08
2007/0214818 A1* 9/2007 Nakamura .................... 62/239

FOREIGN PATENT DOCUMENTS

JP 06-211048 8/1994

* cited by examiner

*Primary Examiner*—H Gutman
(74) *Attorney, Agent, or Firm*—The Webb Law Firm

(57) ABSTRACT

A door structure for a cab includes a door frame defining an entrance to the cab, a door for opening and closing the entrance, a hinge disposed between the door and the door frame and having an axis, the door being configured to be allowed to swing about the axis of the hinges between an open position and a closed positions, a door handle attached to the door for opening and closing the door, and a door lock for locking the door in the closed position. The door includes a door body formed of resin, and a reinforcing frame fixed to the door body. A gap between the door body and the door frame when the door is in the closed position is sealed by a seal material interposed between the door body and the door frame.

6 Claims, 6 Drawing Sheets

CAB DOOR STRUCTURE

BACKGROUND OF THE INVENTION

This invention relates to a cab door structure having a door swingable to open and close an entrance to a cab.

A known cab door structure, as disclosed in JP 6-211048, for example, has a door with door glass attached to a door body, which door is swingable fore and aft about an axis of a pivotal support.

In the conventional cab door structure disclosed in the above document, the door in a closed state is sealed by a seal material interposed between the door body and a door frame. To secure good door sealing performance with the door body, door frame and seal material.

In order to place the seal material in tight contact uniformly over the entire circumference of the door body and door frame when the door is closed, it is necessary to manufacture the door body and door frame with sufficient accuracy. To secure rigidity of the door itself and rigidity of the cab, the door body and door frame, generally, are manufactured by plate working of a steel material. However, because of the relatively large size, it has been difficult to manufacture the door body and door frame with sufficient accuracy. Specifically, when welding the door body and door frame, for example, it is necessary to remove welding stress after the welding in order to achieve accuracy. When press forming the door body and door frame, large press dies must be manufactured with sufficient accuracy. Thus, it has been difficult to manufacture the door body and door frame with sufficient accuracy.

Therefore, a construction employed for securing good door sealing performance with the seal material interposed between the door body and door frame, as in the conventional cab door structure, poses a problem of raising the cost of manufacturing the door body, and a problem of taking time in assembling and adjusting operations and increasing man-hour for attaching the door to the door frame, which has been the cause of high manufacturing cost. The above problems are conspicuous particularly in the case of working vehicles having cabs, since the volume of production is small compared with passenger vehicles, and large sums cannot be invested in plant and equipment.

SUMMARY OF THE INVENTION

The object of this invention is to solve at least part of the problems noted above.

A door structure for a cab according to this invention comprises:
a door frame defining an entrance to the cab;
a door for opening and closing the entrance;
a hinge disposed between the door and the door frame and having an axis, said door being configured to be allowed to swing about the axis of the hinges between an open position and a closed position;
a door handle attached to the door for opening and closing the door; and
a door lock for locking the door in the closed position;
wherein the door includes a door body formed of resin, and a reinforcing frame fixed to the door body, a gap between the door body and the door frame when the door is in the closed position being sealed by a seal material interposed between the door body and the door frame.

First, advantages of forming the door body of resin will be described. Compared with a door body formed by plate working of a steel material, the door body formed of resin can be processed relatively easily, for example, by press working even if the door body is relatively large. Therefore, the door body may be manufactured at low cost. Processing after formation (e.g. processing of ends of the door body, and drilling process) can also be carried out relatively easily. Thus, at a site of assembling the door, for example, the door body formed of resin can be additionally processed according to the shape of the door frame before assembling the door to the door frame. That is, formation and processing after the formation of the door body can be carried out relatively easily.

By forming the door body of resin, formation and processing after the formation of the door body can be carried out relatively easily. With the reinforcing frame fixed to the door body, even when the door body is formed of resin, the strength of the door can be secured by combination of the door body and reinforcing frame. That is, the door easy to form and process after formation is realized while securing the strength of the door.

The door in the closed position can be sealed by the seal material interposed between the door body and door frame. The door is closed by operating the door handle, to place the door body formed of resin in tight contact with the door frame through the seal material. Then, in addition to a reaction force of the seal material itself a reaction force of elastic deformation of the door body formed of resin is applied to the seal material. Therefore, the door can be placed in tight contact with the door frame by the reaction force of the seal material and the reaction force by elastic deformation of the door body. That is, by effectively utilizing the restoring force by elastic deformation of the door body formed of resin, the seal material attached to the door and the door frame (or the seal member attached to the door frame and the door) can be placed in tight contact with each other.

Thus, a door easy to form and to process after formation is realized while securing strength of the door. Such a door can be manufactured at low cost, and assembling and adjusting operations for attaching the door to the door frame are carried out easily, to achieve a reduced manufacturing cost.

DETAILED DESCRIPTION OF PREFERRED EMBODIMENTS

[Overall Construction of Utility Vehicle]

Figure 1:
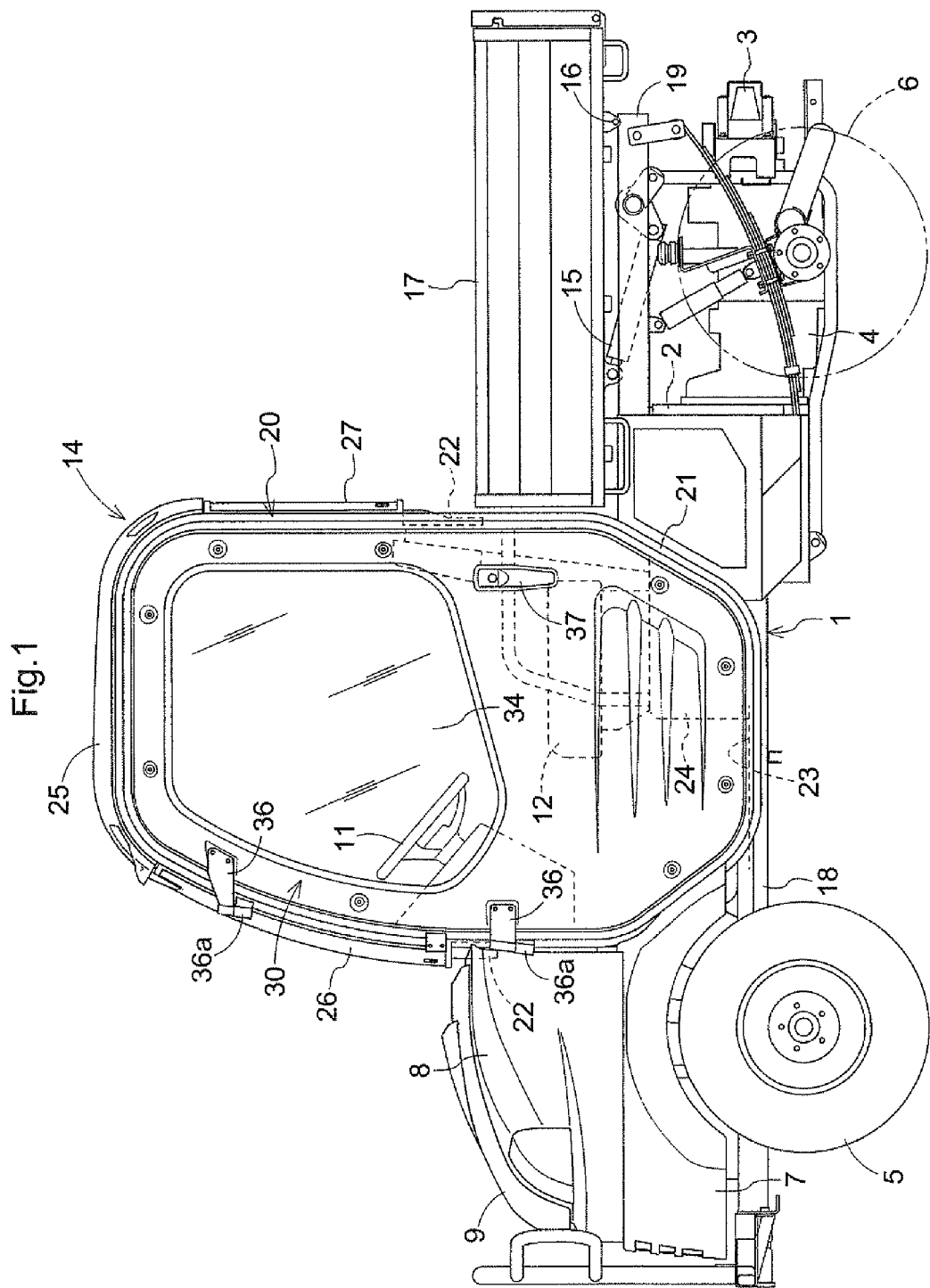
FIG. 1 is a left-hand side elevation of a utility vehicle.
Figure 2:
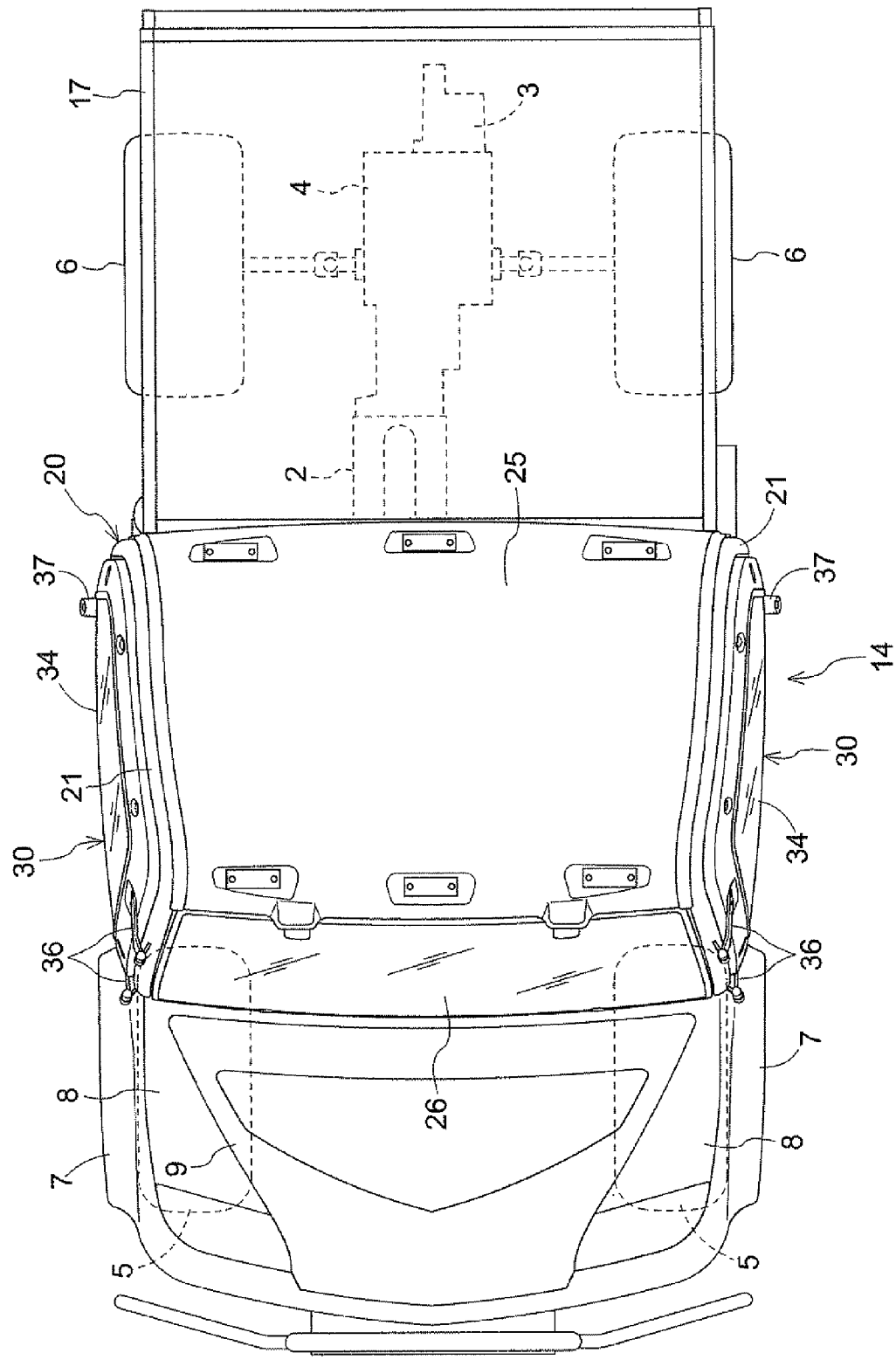
FIG. 2 is a plan view of the utility vehicle.

FIG. 1 shows a side elevation of a utility vehicle which is one example of working vehicles. FIG. 2 shows a plan view of the utility vehicle. The utility vehicle is constructed to be the four-wheel drive type for transmitting power from an engine 2 mounted in a vibration-proofing manner on a vehicle body frame 1, through a gear type change speed device 4 and a hydrostatic stepless transmission 3, to right and left front wheels 5 and right and left rear wheels 6.

The utility vehicle includes, arranged on a front part thereof, lower covers 7 acting also as front wheel fenders, an upper cover 8 opening in an upper, transversely middle portion thereof, and a hood 9 pivotably openable and closable to openably cover the opening of the upper cover 8.

The utility vehicle includes a cab 14 disposed in a longitudinally middle position thereof and having a steering wheel 11 for steering the front wheels 5, and a driver's seat 12. The cab 14 defines a boarding space therein.

A hydraulic dump cylinder 15 is disposed in a rearward position of the utility vehicle and above the gear type change speed device 4. The dump cylinder 15 is extendible and contractible for vertically rocking a loading platform 17 to take dumping action about a pivot shaft 16 extending transversely in a rear end unit region of the vehicle body frame 1.

The vehicle body frame 1 includes a cab frame 20 for forming the boarding space, and a front frame 18 and a rear frame 19 extending forward and rearward from the cab frame 20. The various frames 18, 19, 20 and so on constituting the vehicle body frame 1 are firmly connected together by welding.

The cab frame 20 includes a pair of right and left door frames 21 each defining an entrance, a plurality of cross members 22 extending between the right and left door frames 21, a floor panel 23 defining a floor of the boarding room, a support frame 24 for supporting the driver's seat 12, and a roof panel (not shown) disposed in a top portion of the boarding room and extending between the right and left door frames 21.

A front plane and a rear plane of the cab frame 20 are covered with an openable windshield 26 and an openable rear glass pane 27, respectively. An area above the roof panel is covered with an outer roof 25 formed of resin.

In both side planes, the cab frame 20 has doors 30 to be described hereinafter. When open/close handles 37 are operated from inside or outside to release door locks 38, the pair of right and left doors 30 of the outswinging type may open in a single swing mode about an axis of hinges 36.

Thus, the cab 14 has the driver's seat 12, outer roof 25, windshield 26, rear glass pane 27 and doors 30 assembled to the cab frame 20.

[Detailed Door Structure]

Figure 3:
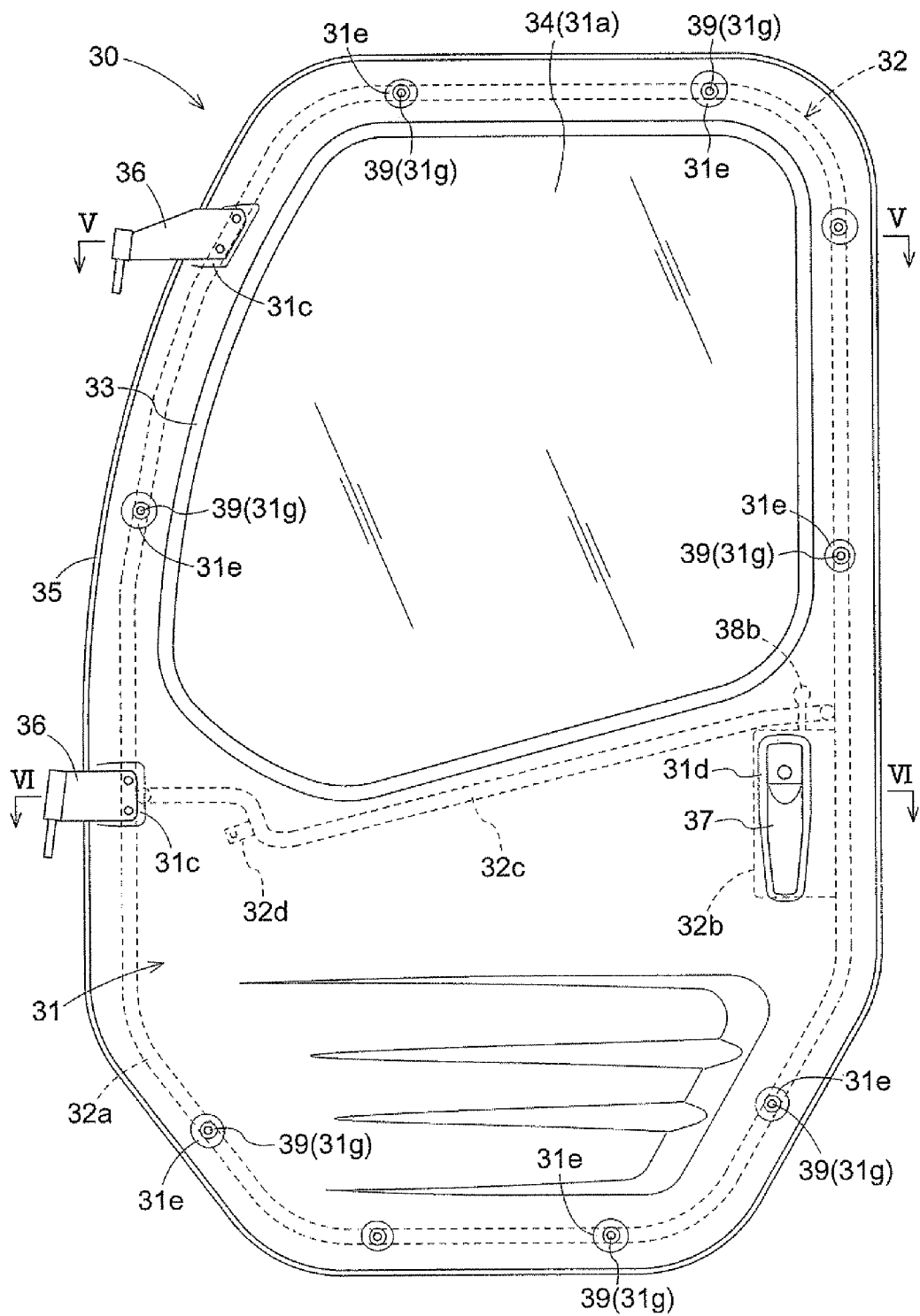
FIG. 3 is a side view of a left-hand side door seen from outside.
Figure 4:
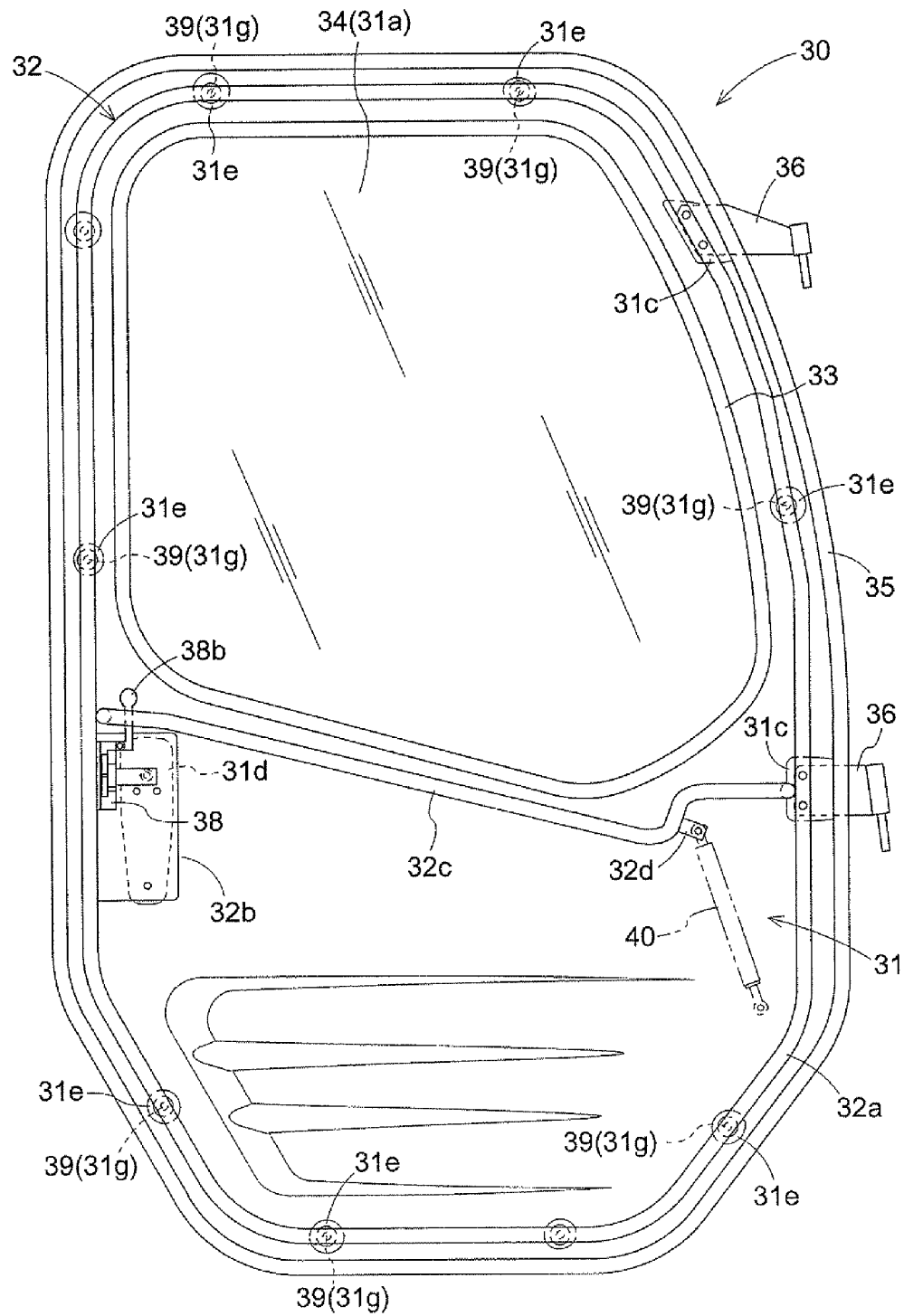
FIG. 4 is a side view of the left-hand side door seen from inside.
Figure 5:
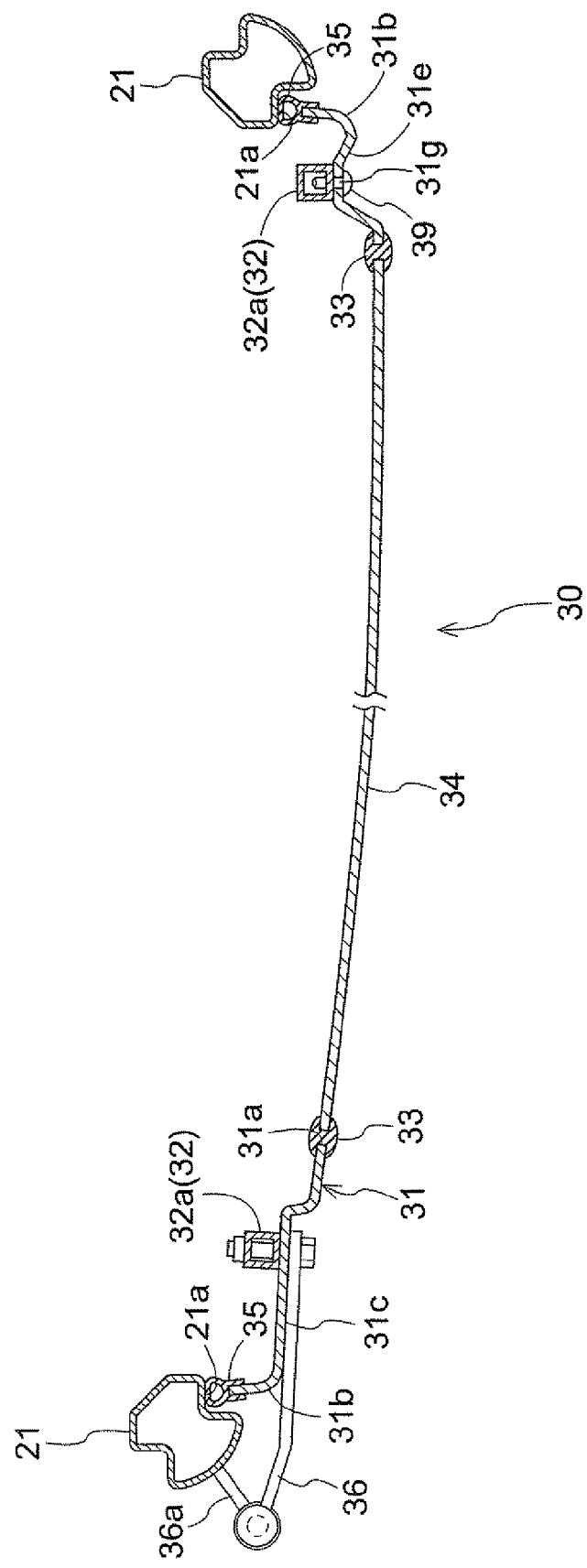
FIG. 5 is a section taken on line V-V of FIG. 3 and showing the structure of the door.
Figure 6:
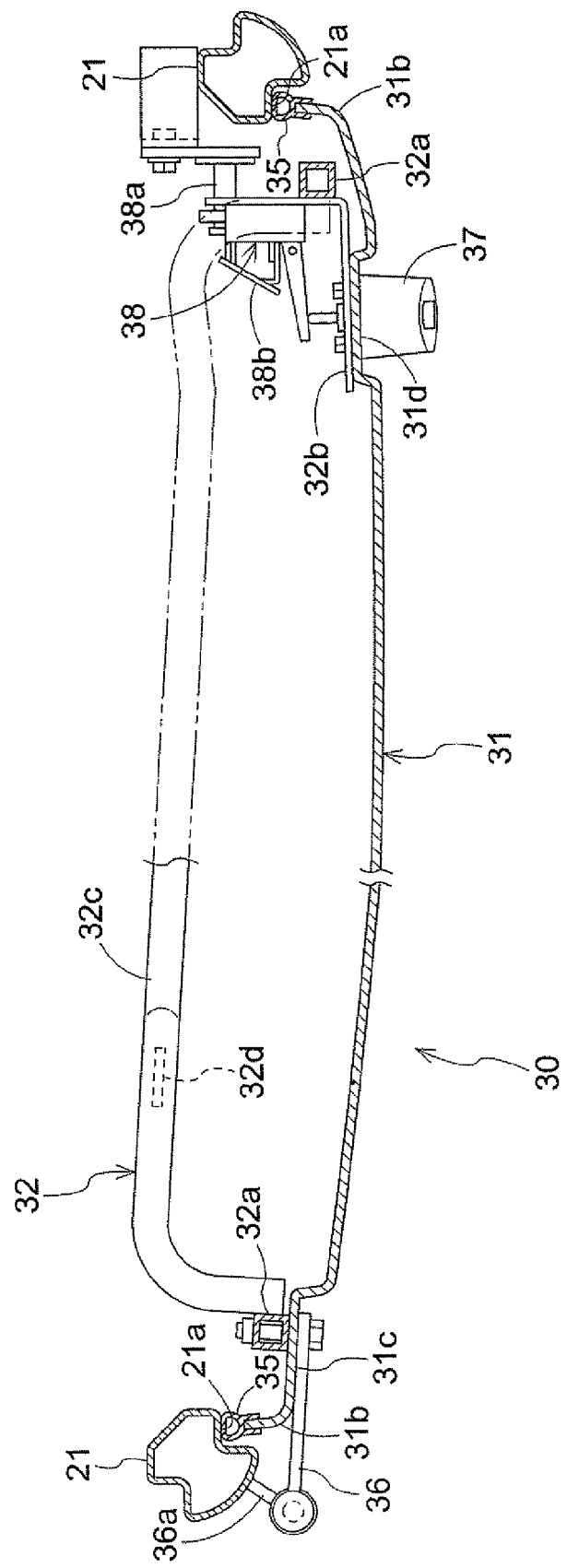
FIG. 6 is a section taken on VI-VI of FIG. 3 and showing the structure of the door.

A door structure of the cab 14 according to this invention will be described with reference to FIGS. 3 through 6. FIG. 3 is a side view of door 30 seen from outside. FIG. 4 is a side view of door 30 seen from inside. FIGS. 5 and 6 show sections taken on line V-V and a section taken on line VI-VI of FIG. 3, with the door 30 attached to the door frame 21, respectively. FIGS. 3 through 6 show the door 30 on the left-hand side of the utility vehicle. The right-hand side door 30 is the same as left-hand side door 30 except the right and left features.

As shown in FIGS. 3 and 4, the door 30 includes a door body 31 formed of resin, a reinforcing frame 32 fixed to the door body 31, a side glass pane 34 attached to the door body 31, an open/close handle 37 and a door lock 38.

The door body 31 forming the door 30 is constructed by pressing an ABS resin plate and coating the surfaces with acrylic sheet. An opening 31a is formed in a central part of the door body 31, and a side glass pane 34 is mounted in the opening 31a through packing 33.

The door body 31 has a curved portion 31b formed on its periphery which is curved inward over the entire circumference thereof. A seal material 35 is fixedly fitted on the edge of the curved portion 31b from inside over the entire circumference (see FIG. 5). By forming the curved portion 31b on the periphery of the door body 31 in this way, strength of the door body 31 is secured at the periphery of the door 30.

By forming the door body 31 with resin, the edge of the curved portion 31b for receiving the seal material 35 can be cut easily to fit with the door frame 21, and mounting bores for attaching the hinges 36 can be formed easily. Thus, when attaching the door body part 31 to the door frame 21, for example, any additional shaping can be carried out easily to improve the efficiency of assembling work.

The door body 31 has hinge mounts 31c for securing the hinges 36 for connecting the door 30 to the door frame 21, a handle mount 31d for fixing the open/close handle 37 to the door body 31, and frame holding parts 31e for connecting the reinforcing frame 32 to the door body 31.

Each mount 31c is in the form of an inward recess in an outer surface of the door body 31. One of the hinges 36 of the insertion type is fixed to this recess from outside. The hinge 36 of the insertion type is inserted from above into a boss 36a (FIG. 1) fixed to the door frame 21 fixed to the door body 31, whereby the door 30 is attached to be openable and closable to the door frame 21.

The handle mount 31d is in the form of an inward recess in the outer surface of the door body 31. The open/close handle 37 is fixed from outside to this recessed portion. Each frame holding part 31e is in the form of an inward recess in the outer surface of the door body 31, and a mounting bore 31g is formed in this recessed portion for fixing the reinforcing frame 32.

By forming the hinge mounts 31c, handle mount 31d and frame holding parts 31e as inwardly recessed from the outer surface of the door body 31 as described above, the hinges 36, open/close handle 37 and frame fixing screws 39 can be attached in a way not to protrude from the outer surface of the door body 31. Thus, the open/close handle 37 and so on may be attached not to be obstructive to operation of the utility vehicle, and moreover to improve the appearance of the vehicle.

The reinforcing frame 32 includes a pipe portion 32a formed by bending a square steel pipe into a loop shape, a bracket 32b for attaching the door lock 38, and a handrail 32c to be described hereinafter. A plurality of nuts are formed on the reinforcing frame 32 for connection to the door body 31. The reinforcing frame 32 is placed in contact, from inside, with the inwardly recessed portions of the frame holding parts 31e and handle mount 31d formed on the door body 31, and is fixed to the door body 31 by the frame fixing screws 39 through the mounting bores 31g from outside the door body 31.

The door lock 38 which can be locked is fixed to the bracket 32b. By closing the door 30 and engaging of the door lock 38 with a lock pin 38a fixed to the door frame 21, the door 30 can be maintained in a closed position (see FIG. 6). An unlocking device 38b is attached to the door lock 38. When the unlocking device 38b is operated from inside or the open/close handle 37 is operated from outside, the door lock 38 is canceled for allowing the door 30 to be opened.

As shown in FIG. 4, the handrail 32c is fixed to a position of the reinforcing frame 32 adjacent the lower hinge 36 and a position of the reinforcing frame 32 just above the open/close handle 37. A gas damper mounting bracket 32d is fixed to a lower forward part of the handrail 32c.

The handrail 32c is formed of a bent cylindrical pipe having opposite ends thereof bent toward the reinforcing frame 32. By bending the cylindrical pipe, the handrail 32c can be placed to extend along the lower edge of the side glass pane 34. Thus, handrail 32c does not obstruct a field of view of the outside of the side glass pane 34 seen from the driver's seat 12. The appearance of the driver's seat 12 can also be improved.

A gas damper 40 is attached between the door frame 21 and the gas damper mounting bracket 32d fixed to the handrail 32c for assisting opening and closing of the door 30. Thus, there is no need to additionally provide a stay (not shown) or the like for attaching the gas damper 40, to reduce manufacturing cost. This construction makes it easy for the reaction force of the gas damper 40 to act on the door 30, and allows the gas damper 40 to be located in a position hardly obstructive to the opening and closing of the door 30.

As shown in FIGS. 5 and 6, each of the right and left door frames 21 in a loop form defining an entrance has a recessed door receiving portion 21a formed over the entire circumference thereof to fit with the door 30. The door 30 is attached to the door receiving portion 21a through the hinges 36 so that the seal material 35 fixed to the edge of the curved portion 31b is in tight contact with the door receiving portion 21a when the door 30 is closed, with the positions of the door lock 38 and lock pin 38a adjusted.

When the door 30 is closed and the door lock 38 is engaged with the lock pin 38a fixed to the door frame 21, the door 30 imparts a tightening force on the seal material 35, compressing the seal material 35, thereby to secure good sealing performance between the door 30 and door receiving portion 21a. The tightening force of the door 30 acts also on the door body 31, whereby the door body 31 undergoes a slight elastic deformation. A restoring force of this elastic deformation acts in a direction to press the seal material 35 on the door receiving portion 21a of the door frame 21, to promote the sealing performance between the door 30 and door receiving portion 21a.

In particular, the curved portion 31b is formed peripherally of the door body 31, and the curved portion 31b and reinforcing frame 32 are arranged such that the curved portion 31b lies outside the reinforcing frame 32 as shown in FIG. 4. Thus, the tightening force of the door 30 transmitted to the door body 31 by pushing and pulling the handrail 32c can hardly act on a portion surrounded by the reinforcing frame 32 shown in FIG. 4, but can easily act on the curved portion 31b located outside the portion surrounded by the reinforcing frame 32. Consequently, the tightening force of the door 30 can be applied effectively to the seal material 35 through the curved portion 31b.

The reinforcing frame 32 is attached to extend along, with a uniform spacing from, the curved portion 31b formed peripherally of the door body 31. Thus, the tightening force of the door 30 is operative uniformly over the entire circumference of door 30.

Further, with the curved portion 31b formed peripherally of the door body 31, the tightening force of the door 30 slightly deforms the curved portion 31b, and the door body 31 undergoes elastic deformation. Then, the restoring force of this elastic deformation can act on the seal material 35 in directions perpendicular to sealing surfaces of the door frame 21, to promote the sealing performance of the door 30.

First Modified Embodiment of the Invention

In the above embodiment, each door 30 is swingable open about the axis of the hinges 36 arranged at the front of the door 30. Instead, the hinges 36 may be arranged at the rear of each door 30, so that the door 30 is swingable open about the axis of the hinges 36 arranged at the rear of the door 30. The seal material 35 may be fixed to the door frame 21 rather than being fixed to the curved portion 31b of the door body 31.

Second Modified Embodiment of the Invention

In the above embodiment, the door body 31 forming the door 30 is constructed by pressing an ABS resin plate. The door body 31 may be formed of a different material as long as it is an elastic resin. For example, a plastic plate or synthetic resin plate may be employed.

In the above embodiment, the reinforcing frame 32 is formed of square steel pipe, and the handrail 32c formed of cylindrical pipe. The reinforcing frame 32 and handrail 32c may have other sectional or outward shapes.

Third Modified Embodiment of the Invention

In the above embodiment, the invention is applied to the door structure of the cab 14 of the utility vehicle shown as an example of working vehicles with cabs 14. The invention is equally applicable to the door structure of cabs 14 of other types of working vehicle, e.g. agricultural working vehicles such as tractors and combines, and construction working vehicles such as backhoes and wheel loaders.

What is claimed is:

1. A door structure for a cab comprising:
   a door frame defining an entrance to said cab;
   a door for opening and closing said entrance;
   a hinge disposed between said door and said door frame and having an axis, said door being configured to be allowed to swing about said axis of said hinge between an open position and a closed position;
   a door handle attached to said door for opening and closing said door; and
   a door lock for locking said door in said closed position;
   wherein said door includes a door body formed of resin, and a reinforcing frame fixed to said door body, and a gap between said door body and said door frame when said door is in said closed position being sealed by a seal material interposed between said door body and said door frame, and wherein said door body includes a curved portion which is curved inward relative to the cab over a substantially entire circumference of said door body, and lies outside of said reinforcing frame, said sealing material being disposed on an edge of said curved portion of said door body.

2. A door structure as defined in claim 1, further comprising a handrail extending between a portion of said reinforcing frame adjacent said hinge and a portion of said reinforcing frame adjacent said door handle.

3. A door structure as defined in claim 1, further comprising an unlocking device disposed in a vertically middle region of said door.

4. A door structure as defined in claim 1, wherein said reinforcing frame extends substantially over an entire peripheral region of said door body.

5. A door structure as defined in claim 1, wherein said reinforcing frame includes a pipe portion formed by bending a pipe material into a loop shape.

6. A door structure as defined in claim 1, wherein the seal material is fixedly fitted on the edge of the curved portion from inside over the entire circumference.

* * * * *